United States Patent [19]

Ilon

[11] 4,084,275
[45] Apr. 18, 1978

[54] COVER FOR A LIFTING DEVICE AND METHOD OF UTILIZING SAME

[76] Inventor: Bengt Erland Ilon, Benzeholzstrasse 39, CH-6045 Meggen/Luzern, Switzerland

[21] Appl. No.: 711,961

[22] Filed: Aug. 5, 1976

Related U.S. Application Data

[62] Division of Ser. No. 561,976, Mar. 25, 1975, Pat. No. 3,978,531.

[30] Foreign Application Priority Data

Apr. 1, 1974 Sweden .............................. 7443431

[51] Int. Cl.² .......................... A61G 7/10; A47B 83/04
[52] U.S. Cl. ........................................ 5/81 R; 4/113; 5/92; 128/262
[58] Field of Search ............... 5/81 R, 90, 91, 92; 4/113; 128/262

[56] References Cited

U.S. PATENT DOCUMENTS

| 3,178,732 | 4/1965 | Stibitz | 5/81 R |
| 3,757,788 | 9/1973 | Renfroe | 5/81 R |
| 3,895,403 | 7/1975 | Davis | 5/81 R |
| 3,978,531 | 9/1976 | Llon | 5/81 R |

*Primary Examiner*—Casmir A. Nunberg
*Attorney, Agent, or Firm*—Bacon & Thomas

[57] ABSTRACT

A protective cover for a lifting device which may be rolled to a position under an object to effect lifting thereof, and a method of utilizing the cover. The lifting device is particularly useful in the lifting of human patients as it accomplishes lifting by a rolling action without sliding action between the patient and the exterior of the lifting device. It comprises a hollow member of flexible material with a recess running from end to end entirely through the member and a driving stick for driving the hollow member. The cover comprises an elongate tubular member which is coupled to the stick to be drawn into the recess, which moves to cover the outside of the hollow member during a lifting operation, and which is drawn back into the recess and everted on withdrawal of the hollow member to lower the patient.

10 Claims, 12 Drawing Figures

COVER FOR A LIFTING DEVICE AND METHOD OF UTILIZING SAME

CROSS-REFERENCE TO RELATED APPLICATION

This application is a continuation of my copending U.S. patent application Ser. No. 561,976, filed Mar. 25, 1975, entitled Lifting Device, now U.S. Pat. No. 3,978,531.

BACKGROUND

1. Field of the Invention

The present invention relates to a protective cover for a lifting device that is intended to be wholly or partly placed beneath a human body, the body of an animal, or an inanimate object which is to be wholly or partly lifted or raised from a substrate, and a method of utilizing the cover. The lifting device comprises a hollow member made of a flexible material that is expanded by means of at least one medium, preferably a pressurized medium, to give the hollow member a certain shape, and the cover is adapted to protect said hollow member against contamination.

2. Description of the Prior Art

Two different types of such lifting devices have previously been proposed, i.e., devices with a sleeve driven by compressed air and made from an elastic material and devices shaped as a pillow of elastic material which pillow is kept extended by means of compressed air and which is operable by means of an operating means. This operating means has an anchoring portion that is sealingly connected to two ends of the pillow which face each other. To perform a lifting action the devices of the first mentioned type require access to an assembly for compressed air which, however, is not required to operate the pillow shaped device. However, both devices have a primary disadvantage in that, at most, the extent of their travel corresponds to only a fraction of the total length of the device. In known devices operating with compressed air, the travel actually corresponds to half the total length of the device and in the pillow shaped devices this travel is only somewhat greater. As a result, the total length of the known devices may not be utilized for the lifting action but only a fraction thereof, is used.

SUMMARY

One purpose of the present invention is to provide a protective cover for a lifting device of the type mentioned above wherein the total length of the lifting device is utilized for the lifting or raising operation by giving the hollow member of the lifting device an annular shape so that the wall of the hollow member defines a recess extending entirely through the hollow member, permitting insertion of a driving element, such as a driving stick. The driving stick frictionally grips the wall of the hollow member in the region of the recess and, by pushing the driving stick into the recess, the hollow member may be driven a distance that at least corresponds to the other dimensions of the hollow member.

The cover is for the purpose of preventing the surface of the hollow member from contacting the object to be lifted, especially to prevent transfer of bacteria in the treatment of human patients and animals. It comprises a particular bag shaped container, which bag is adapted to be applied to the hollow member in a certain way.

DRAWING

The invention will be further described below with reference to the accompanying drawings, in which.

Figure 10:
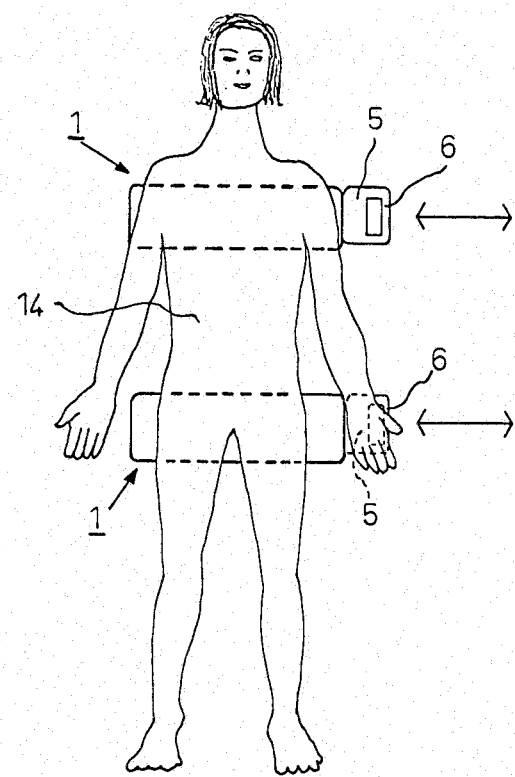
Figure 12:
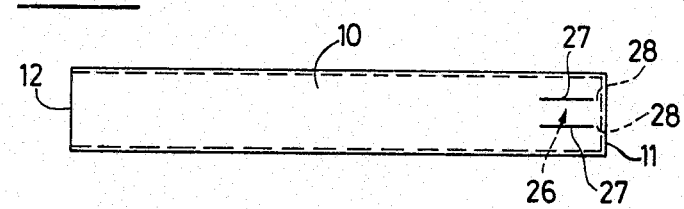
Figure 11:
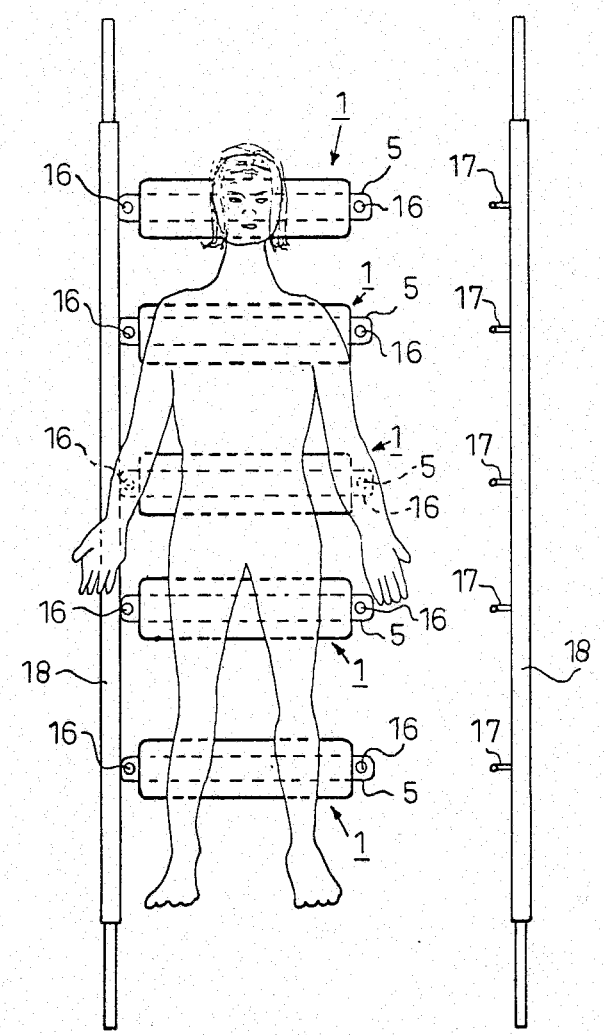

FIG. 10 schematically illustrates a person lifted by two hollow members;

FIG. 11 illustrates a person lifted or raised by five hollow members intended to be mounted to supporting bars in order to define a stretcher; and FIG. 12 illustrates an alternate embodiment of the bag-like container or cover.

A lifting device designed according to the invention to lift patients comprises a sleeve shaped hollow member 1, which preferably is made from an elastic rubber material. The wall 2 of the hollow member is haped to define a recess 3 extending entirely through the hollow member 1. Thus, the portions of the wall 2 of the hollow member on both sides of the recess each have an endless configuration. This may be observed if one starts from the exterior of the hollow member and follows the same around one end of the hollow member and into the recess, then along the recess to the second end of the hollow member and via this to the exit point on the exterior of the hollow member 1. The wall 2 of the hollow member is kept extended by means of a medium, which in the exemplifying embodiment comprises compressed air, fed through a valve 4 or a cannula inserted obliquely inwardly through a thickened portion of the wall 2 of the hollow member.

As a result of the endless structure of the wall 2 portions of the hollow member 1 may be driven a distance at least corresponding to the total length thereof.

Figure 1:
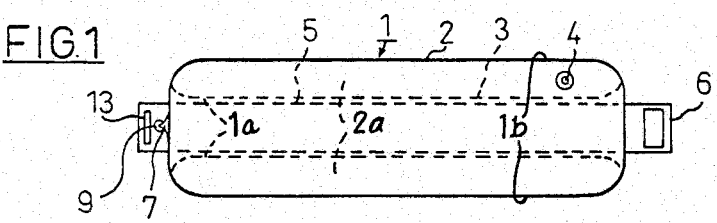
FIG. 1 is a plan view illustrating the hollow member according to the invention with a driving element inserted therein.

It will be readily apparent from the present description and from the drawing that hollow member 1 may be considered to have an inner portion 1a and an outer portion 1b (see FIG. 1). The inner portion 1a surrounds and defines recess 3, while the outer portion 1b surrounds the inner portion and defines the exterior surface of the member. As will also be readily apparent, the inner and outer portions define an enclosed chamber 2a (FIG. 1) in member 1, the enclosed chamber surrounding recess 3 and having a generally elongated, flattened, toroidal configuration.

The driving action may be performed by means of different driving means, in the simplest case by an attendant inserting his arm into the recess 3. The hollow member 1 is thereby displaced a distance dependent upon how far the arm is inserted. The displacement distance is even not limited to slightly more than the length of the hollow member 1. Indeed, if so required, the displacement may be substantially greater; principally, the hollow member 1 may be displaced a distance corresponding to the length of the attendant's arm.

However, according to the exemplifying embodiment, driving of the hollow member is not obtained by means of an attendant's arm but with the aid of a driving stick 5, which may displace the hollow member 1 a distance that somewhat exceeds the total length thereof, which in the normal case is quite enough. The driving stick 5 is designed to fit into the recess 3 and the length thereof is greater than that of the hollow member 1. To facilitate the driving, one end of the driving stick 5 is provided with a handle 6 and the second end of the same is suitably connected to the wall 2 of the hollow member 1. The connection is not required to effect the driving, but it may be advantageous in some cases. The connection is preferably intended to be releasable from the wall 2 of the hollow member and/or the driving stick 5. A particularly advantageous form of releasable connection comprises a projection 7 that is securely affixed to the wall 2 of the hollow member. The projection 7 has an elastic end knob 8, to be pressed through a hole 9 in the end of the driving stick 5 so that the knob, after pressing through the hole, expands and locks the end 7 against being pulled outwardly during driving of the hollow member 1. In another type of connection which is useful in practice the end 7 is provided with a loop (not shown) through which a locking pin (not shown) may be inserted to prevent the pulling of the end 7 out from the opening 9.

Figure 3:
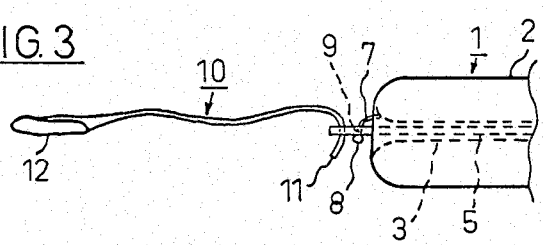
FIG. 3 illustrates this container or cover mounted to the driving element.
Figure 4:
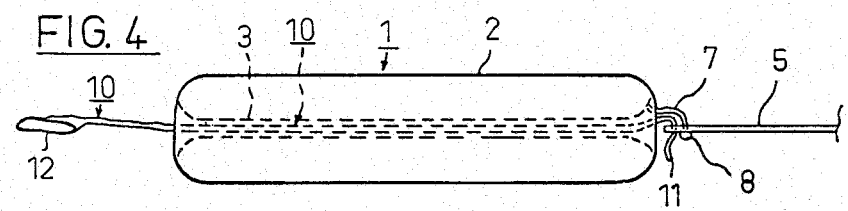
FIG. 4 illustrates the container or cover drawn into a recessed portion of the hollow member.
Figure 5:
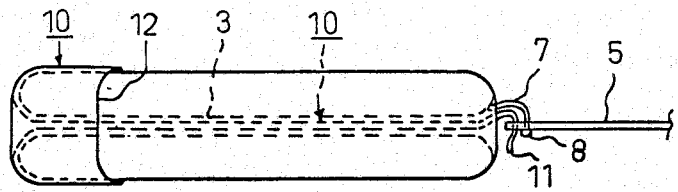
FIG. 5 illustrates the end of a container or cover folded around the hollow member.

When the hollow member 1 is to be used for handling patients it is essential — and in many cases for bacteriological reasons absolutely necessary — to keep the wall 2 from contacting the body to be lifted. In order to prevent such body contact, there is provided a bag shaped container or cover 10 of a flexible material, preferably a plastic material. This container 10 is of longitudinal shape, and the length thereof exceeds that of the hollow member 1. The container is closed at one end 11 thereof and open at the other end 12. Furthermore, the container 10 is designed so that it may be pulled into the recess 3 of the hollow member 1 and at the same time be folded outwardly around the hollow member 1. The container 10 is mounted to the driving stick 5 in the region of the closed end 11 of the container. In order to permit this, the stick has a longitudinal, transverse opening 13 at one end thereof. In case the lifting device according to the invention is to be used to raise or lift patients without the wall of the hollow member engaging the body of the patient, the bag shaped container 10 is used. This is accomplished by driving the stick 7 through recess 3 until the end thereof provided with the opening 13 lies free. The closed end of the container 10 is thereafter inserted through this opening 13 (FIG. 3). Subsequently, the driving stick 7 is retracted until the container 10 totally or partly extends through the recess 3 but with the open end portion 12 of the container lying outside the recess (FIG. 4). This end portion 12 is folded outwardly over the hollow member 1, so that the same defines a cover for the end of the hollow member 1 (FIG. 5). Thus, the lifting device is ready for lifting or raising a patient 14 as schematically indicated in the drawings.

The container 10 illustrated in FIGS. 1–7 is well suited for the present purposes. However, the design of the container may be varied in order to obtain certain, special advantages. As is shown in FIG. 12, the container 10 at its closed end 11 (in this embodiment the closed end may be open) is provided with an inner passage 26, which opens against the open end 12 of the container 10. The passage is manufactured in a very simple way, namely by providing the container with two weld beads or seams 27, which weld together opposed wall portions of the container 10. The beads 27 are arranged to define a passage 26 of such size that the end portion of the driving stick 5 may be inserted into the passage 26. The passage 26 opens at the closed end of the container 10, i.e., the weld beads 27, while extending to locations adjacent to the sealed edge of the container 10, start a bit away from the sealing edge so that between the sealing edge and the weld beads 27 apertures 28 are defined, through which apparatus air may flow when the driving stick 5 is inserted into and withdrawn from the passage 26. To ensure tightness of fit, the passage is preferably slightly less in size than that end portion of the driving stick 5 which is to be inserted in the passage. This means that the container 10 may, in a simple way, be secured at the end portion of the driving stick 5.

This structural embodiment of the container 10 gives the following handling possibilities. The driving stick 5 is brought from one side through recess 3 of the hollow member 1, so that the end portion thereof projects from the other side. The driving stick 5 is held in one hand and the hollow member is also held in the same hand. The container 10 is held in the other hand, and the hollow member 1 with the driving stick 5 is inserted into the container 10 until the end portion of the driving stick enters the passage 26, which means that the container 10 will be secured on the driving stick 5.

Thereafter, the driving stick is withdrawn, whereby the container 10 follows the stick 5 into the recess 3. The container length is so chosen that portions of the container completely or partially cover the outside of the hollow member when the major part of the driving stick 5 is withdrawn from the hollow member 1. The device is then ready for a lifting operation.

After the lifting operation, the driving stick 5 is completely withdrawn from the recess 3, and is loosened from the container 10 by withdrawing it from the passage 26. Finally, the container 10 is withdrawn in the opposite direction from the recess 13 thereof.

The shape of the container 10 is such that it may be saved and used as a storage bag for the hollow member 1 and the driving stick 5, and the stick may already be inserted into the passage 26 during storage.

The container 10 has been described as being closed at one end. In some cases, this is not necessary, and, therefore, the container 10 may be open at both ends. If desired, such an open container may be sealed after use by knotting together its ends. Open containers of this type may be secured at the driving stick 5 either by providing the containers with one or more couplings for connection to the driving stick, or by providing one or more narrow passages, pockets or the like.

Figure 6:
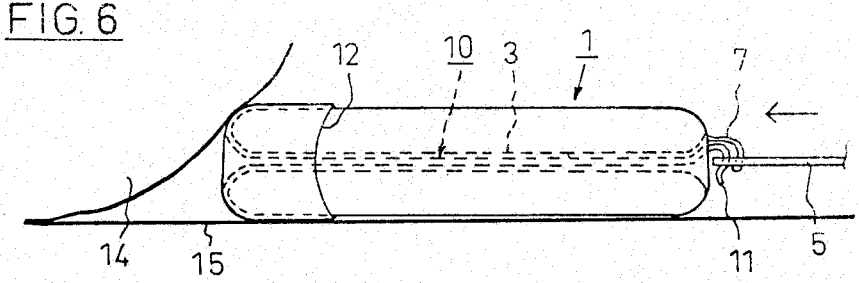
FIG. 6 shows the hollow member positioned to engage an object to be lifted.
Figure 7:
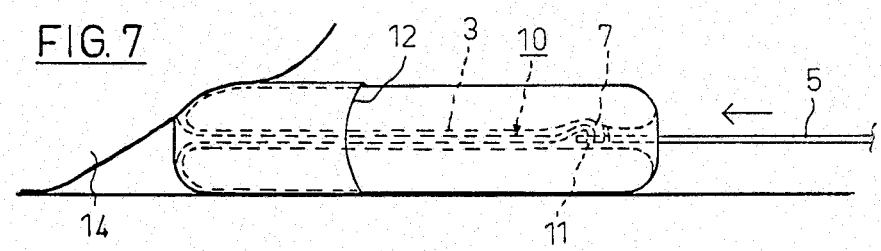
FIG. 7 shows the hollow member during the lifting of the object.

To lift the patient the hollow member 1 is placed beside the patient on the substrate 15 and the end of the hollow member 1 covered by the container 10 is put against the body 14 of the patient (FIG. 6). In this connection, it may be especially noted that it is the inside of the container that engages the body 14. Thereafter, the driving stick 5 is pushed into the recess 3, which means that the hollow member 1 is rolled underneath the body 14 and lifts the same (FIG. 7). By way of the rolling motion of the hollow member 1, the lifting will be performed without sliding of the portion of the hollow member 1 covered by the container against the body 14. In this manner, the hollow member 1 may be rolled entirely beneath the patient, and thus the same provides lifting action along the whole length thereof. This is a key characteristic since thereby the hollow member need not be dimensioned with a greater length than the dimension of the portion of the body 14 that is to be lifted. By the rolling motion of the hollow member 1, the container 10 may cover an ever increasing portion of the exterior of the hollow member 1. Also, the portion of the container 10 covering the exterior of the hollow member 1 will be positioned with the inside thereof outwardly directed. Even if the driving stick 5 is pushed so far that the end portion thereof extends out from the recess 3, the stick will still be enclosed inside the container 10.

During lifting, bacteria from the body and also any purulent matter, contamination and the like will be brought into contact with the inside of the container 10. When the patient is lowered by rolling of the hollow member 1 in the reverse direction, the container 10 is retracted partly into the recess as may be seen in FIG. 4. The bacteria and any blood, purulent matter, contamination and the like clinging to the inside of the container 10 will, by the lifting movement, be present only inside the container 10. Thereafter this may be hermetically closed by knotting or otherwise sealing the open end thereof, whereafter the same may be released from the driving stick 5, may be pulled out from the recess 3 and disposed of in a totally hermetically closed condition.

The container 10 may also be used when the hollow member 1 is operated by an attendant's arm. The same result is obtained when the closed end 11 of the container 10 is manually held.

By providing a number of hollow members in a suitable manner it is possible to raise and/or give support to a patient during an operation; it is possible to facilitate dressing of a resting patient; and it is possible to facilitate making of the bed or performance of excretory functions. Furthermore, it is possible to place X-ray plates beneath the patient for X-ray treatment of the back or the stomach (FIG. 10).

The lifting device is also well suited for forming a stretcher. In this case each end of the driving stick 5 for each hollow member 1 is provided with an end opening 16. In such a manner the driving sticks 5 may be hooked onto hook shaped pins 17 corresponding to the end openings 16, which pins extend from longitudinal support means 18. In this manner it is for example possible to form a stretcher to transfer a patient with a back injury who must not under any circumstances be twisted during the lifting action. However, the lifting device according to the invention is not exclusively useful for handling patients but may advantageously be used to handle animal bodies or objects, the surfaces or containers of which are delicate and must not be subjected to a sliding action.

The hollow member 1 may be made from a flexible rubber-like material, such as plastic, synthetic fabric or reinforced plastic. To facilitate the operation of driving the hollow member, the inner wall 2 of the hollow member may be covered with a layer 19 of a lubricant, such as silicone, thereby reducing the inner frictional resistance of the wall 2. The hollow member may be filled with a pressurized gas or with a liquid having a suitable composition instead of being filled with compressed air. Alternatively, loosely positioned elements, such as, plastic beads, may be provided in the hollow member 1 to keep the member extended. In certain cases it may be advantageous to insert elements positioned in a lubricating liquid in the hollow member or to insert elements resting in a compressed medium.

Figure 8:
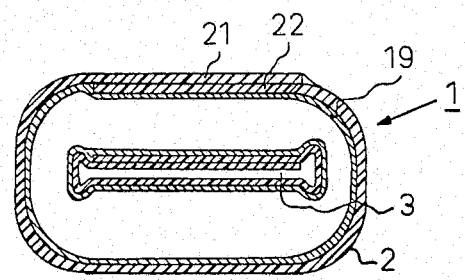
FIG. 8 illustrates a section of the hollow member.
Figure 9:
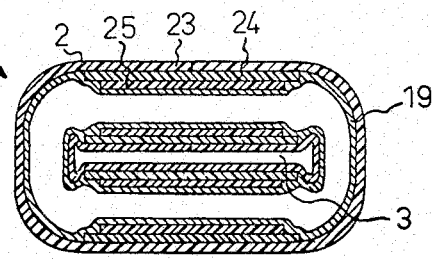
FIG. 9 shows a section of an alternatively shaped hollow member.

In order to guide the hollow member during the rolling motion, the longitudinal portion of the wall 2 which lies against the substrate and/or the oppositely positioned longitudinal portion may be provided with thicker walls than the rest of the hollow member. These thicker walls may comprise two wall portions positioned beside each other (FIG. 8) or may comprise three wall portions positioned beside each other (FIG. 9).

This may be accomplished by joining the hollow member 1 with at least one longitudinal splice 20, whereby the portions 21, 22 on both sides of the edges defining the splice 20 are brought to overlap each other. Alternatively, the portions may be positioned edge-by-edge by a splice 23, whereby plies 24, 25 of material cover the splice 23 on the inside. Sealing of the splice and application of the plies of material, respectively, may, where rubber material is used, be accomplished by vulcanization, or, where plastic material is used, by welding.

Finally, it may be mentioned that the opening 13 in the driving stick 5 for the anchoring of the container 10 is preferably shaped as a slot and positioned between the hole 9 and the end edge of the driving stick 5.

Figure 2:
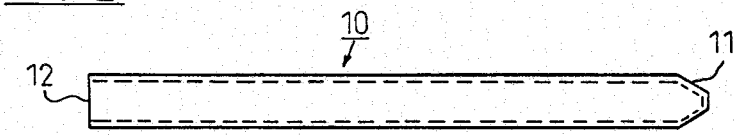
FIG. 2 is a plan view showing a bag shaped container or cover which may be used with the hollow member.

In each of the two embodiments of the container or elongate tubular cover member 10 of FIG. 2 and FIG. 12, the container or cover member 10 is of greater length than the length of the hollow member 1, and is of such girth as to be adapted to surround the hollow member to cover the latter. In each instance, the tubular cover member is open at its end at 12, and is formed adjacent its other end 11 for being releasably coupled to the end portion of the driving stick or driving member 5 extending through the recess 3 for pulling said cover member into the recess by pulling the driving member into the recess, while enabling the cover member to be uncoupled from the driving member. Thus, as to the FIG. 2 cover, the end 11 is tapered as shown for insertion in the opening 13 at the end of the driving member. As to the FIG. 12 cover member, it is adapted to receive the driving stick or elongate driving member 5, with the latter extending through the cover member from the open end 12 of the cover member to the other end of the cover member, and the passage 26 formed by the seams 27 adajcent the other end of the cover member is of smaller girth than the girth of the body of the cover member and adapted to receive the end portion of the driving stick or member 5 with a relatively tight fit of the driving member in the passage thereby to couple the driving member adjacent its end at the closed end of the cover member to the cover member while enabling the driving member to be withdrawn from the passage to uncouple the driving member from the cover member. The driving member is adapted to be inserted in the passage 26 and pushed therethrough to the point where its end engages the closed end 11 of the cover member. The cover member of FIG. 12, as illustrated, has opposed wall portions adapted to lie flat against one another and the passage 26 is formed by the weld beads or seams 27 securing together said wall, these seams extending longitudinally of the cover member on opposite sides of its longitudinal center line adjacent its closed end 11.

As noted above, in the use of the elongate tubular cover member 10 of FIG. 2, the hollow member 1, the elongate driving stick or elongate driving member 5, and the cover member are assembled with the driving member 5 extending completely through the recess 3 of the hollow member from one end thereof with one end of the driving member (its right end as shown in FIG. 1) constituting a handle end projecting out of the right end of the recess for being held in the hand, and its left end projecting out of the left end of the recess, and with the end 11 of the cover member inserted in the opening 13 of the member 5 so as to be releasably coupled to the left and of the driving member. Then, by withdrawing the driving member into the recess (pulling it toward the right) the cover member is pulled by its closed end into the recess. Portion 10 of the cover member is provided covering the hollow member 1 at its left end by folding it like a cuff over the end of the hollow member (see FIG. 5). The lifting operation is effected by rolling the hollow member and is accompanied by movement of the cover member from within the recess 3 to the exterior of the hollow member (see FIG. 7). Part of the inside surface of the cover member is thereby everted to face outwardly on the exterior of the hollow member to protect the latter from contamination. The subsequent lowering operation by reverse rolling of the hollow member is accompanied by retraction of the cover member into the recess with the surface of the cover member that was on the outside at the exterior of the hollow member moving to the inside of the cover member within the recess. Then, as before, the cover member (with any contamination on the inside) is removed from within the recess 3 and from the driving member for disposal.

Also as noted above, in the use of the elongate tubular cover member 10 of FIG. 12, the hollow member 1, the elongate driving stick or elongate driving member 5, and the cover member are assembled with the driving member 5 extending completely through the recess 3 of the hollow member from one end thereof with one end of the driving member (constituting a handle end) projecting out of one end of the recess for being held in the hand, and its other end projecting out of the other end of the recess, with the hollow member 1 in the cover member, and with the said other end of the driving member inserted in the passage 26 wherein it has a tight fit to couple the driving member adjacent its said other end to the cover member. Then, by withdrawing the driving member into the recess (i.e., pulling the driving member back into the recess), the closed end 11 of the cover member is pulled back into the recess, thereby pulling the cover member into the recess. In this case, the cover member is everted so that what was its exterior surface is now its interior surface. In pulling the cover member into the recess, the major portion of the driving member is withdrawn (pulled back) into the recess 3 (as above stated) and the length of the cover member is such that portions of the cover member at least partially cover the outside of the hollow member 1 (similar to what is shown at the left of FIGS. 5 and 6). Then, in effecting a lifting operation by rolling the hollow member under the body (as in FIGS. 5 and 6), there is accompanying movement of the cover member from within the recess to the exterior of the hollow member, part of what was the inside surface of the cover member thereby being everted to face outwardly on the exterior of the hollow member to protect the latter from contamination. Then, in effecting a lowering operation by reverse rolling of the hollow member 1 (by pulling the driving member back through the recess 3), there is accompanying retraction of the cover member into the recess with the surface of the cover member which was on the outside at the exterior of the hollow member moving to the inside of the cover member within the recess for containment of contamination within the cover member. Then, the cover member is removed from the recess and from the driving member for disposal.

It will, of course, be apparent to those skilled in the art that the cover for the lifting device and the method of utilizing the cover according to the present invention may be varied within the scope of the following claims and that the field of use for the device is comparatively large.

What is claimed is:

1. A disposable protective cover for a lifting device, said lifting device comprising a hollow member of thin, flexible material having ends and a recess extending entirely through the member from one end to the other, said recess being open at each end of the member, said member having an inner portion surrounding and defining said recess and an outer portion surrounding said inner portion and defining the exterior surface of said member, said inner and outer portions defining an enclosed chamber in said member, said chamber surrounding said recess and having a generally elongate, flattened, toroidal configuration, said inner and outer portions forming a continuous, uninterrupted surface, and means for driving said member in a rolling action, said driving means comprising an elongate driving member of greater length than the recess of said hollow member adapted to extend through said recess, said disposable cover comprising an elongate tubular cover member having a body and first and second ends, said tubular cover member being made of flexible material of greater length than the length of said hollow member and being of such girth as to be adapted to surround said hollow member to cover said hollow member, said tubular cover member being constructed to fit within said recess of said hollow member, said first end of said tubular cover member being open, said tubular cover member being formed adjacent said first end for outwardly everting folding around the one end of the hollow member of the lifting device when part of the body of the tubular cover member is disposed within the recess of the hollow member, said first end also being constructed for releasable gripping engagement with the exterior surface of the hollow member to move in unison with said exterior surface as the hollow member moves in an everting motion, said tubular member being formed adjacent its second end for being releasably coupled to the end portion of said driving member extending through said recess for pulling said cover member into said recess by pulling said driving member into said recess, while enabling said cover member to be uncoupled from said driving member.

2. A protective cover as set forth in claim 1 as to which said tubular cover member is adapted to receive said elongate driving member with the driving member extending through said tubular cover member from said first end of said cover member to said second end of the said cover member, and said tubular cover member is formed adjacent its said second end with a passage of smaller girth than the girth of the body of said cover member adapted to receive the end portion of the elongate driving member with a relatively tight fit of the driving member in the passage for the said releasable coupling of the cover member and the driving member.

3. A protective cover as set forth in claim 2 wherein said tubular cover member has a closure at its said second end outward of said passage for engagement by the end of said driving member extending through said passage.

4. A protective cover as set forth in claim 2 wherein said tubular cover member comprises opposed wall portions adapted to lie flat against one another, and wherein said passage is formed by seams securing together said wall portions of the cover member.

5. A protective cover as set forth in claim 4 wherein said seams extend longitudinally of said tubular cover member on opposite sides of the longitudinal center line of said tubular cover member adjacent said second end of said cover member.

6. A protective cover as set forth in claim 5 wherein said cover tubular member has a closure at its said second end, the ends of said seams toward said closure being spaced from said closure.

7. A removable protective cover for a lifting device, said lifting device comprising a hollow member of thin, flexible material having ends and a recess extending entirely through the member from one end to the other, said recess being open at each end of the member, said member having an inner portion surrounding and defining said recess and an outer portion surrounding said inner portion and defining the exterior surface of said member, said inner and outer portions defining an enclosed chamber in said member, said chamber surrounding said recess and having a generally elongate, flattened, toroidal configuration, said inner and outer portions forming a continuous, uninterrupted surface, said removable cover comprising an elongate tubular cover member having a body, said tubular cover member being made of flexible material of greater length than the length of said hollow member and being of such girth as to be adapted to surround said hollow member to cover said hollow member, said tubular cover member being constructed to fit within said recess of said hollow member, one end of said tubular cover member being open, said tubular cover member being formed adjacent said one end thereof for outwardly everting folding around one end of the hollow member of the lifting device when part of the body of the tubular cover member is disposed within the recess of the hollow member, said one end of the tubular cover member also being constructed for releasable gripping engagement with the exterior surface of the hollow member to move in unison with said exterior surface as the hollow member moves in an everting motion.

8. The method of claim 7 wherein the open end of the cover member is closed to seal contamination on the cover member.

9. A method of utilizing a protective cover, which cover comprises an elongate tubular cover member with a body and first and second ends, to protect a lifting device, which lifting device comprises a hollow member of thin, flexible material with a recess extending entirely through the hollow member from one end to the other and which utilizes an elongate driving member for driving the hollow member in a rolling, everting action, the method comprising the steps of:

assembling the hollow member, the elongate driving member and the elongate tubular cover member with the driving member extending completely through the recess of the hollow member from one end thereof with one end of the driving member projecting out of one end of the recess for being held in the hand and the other end of the driving member having a portion projecting out of the other end of the recess, and with said second end of said cover member releasably coupled to said end portion of the driving member, withdrawing the driving member into the recess to pull the cover member into the recess, and covering the hollow member at its other end with a portion of the cover member adjacent its first end, effecting a lifting operation by rolling the hollow member with accompanying movement of the cover member from within the recess to the exterior of the hollow member, part of the inside surface of the cover member thereby being everted to face outwardly on the exterior of the hollow member, effecting a lowering operation by reverse rolling of the hollow member with accompanying retraction of the cover member into the recess and with the surface of the cover member that was on the outside at the exterior of the hollow member moving to the inside of the cover member within the recess, and removing the cover member from the recess in the hollow member and from the driving member for disposal.

10. A method of utilizing a protective cover, which cover comprises an elongate tubular cover member, to protect a lifting device, which lifting device comprises a hollow member of thin, flexible material with a recess extending entirely through the hollow member from one end to the other, the method comprising the steps of:

pulling the cover member into the recess and covering an end of the hollow member with a portion of the cover member adjacent one end of the cover member, effecting a lifting operation by rolling the hollow member with accompanying movement of the cover member from within the recess to the exterior of the hollow member, part of the inside surface of the cover member thereby being everted to face outwardly on the exterior of the hollow member, effecting a lowering operation by reverse rolling of the hollow member with accompanying retraction of the cover member into the recess and with the surface of the cover member that was on the outside at the exterior of the hollow member moving to the inside of the cover member within the recess, and removing the cover member from the recess in the hollow member.

* * * * *